United States Patent
Peirce et al.

(10) Patent No.: US 6,738,469 B1
(45) Date of Patent: May 18, 2004

(54) METHOD AND SYSTEM FOR PERFORMING DIALLING OF A TELEPHONE NUMBER SUPPLIED FROM A DATA STORE

(75) Inventors: Stephen Francis Peirce, Suffolk (GB); Robert Grenville Brockbank, Suffolk (GB); Derek John Emerson, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/673,855

(22) PCT Filed: May 19, 1999

(86) PCT No.: PCT/GB99/01585
§ 371 (c)(1),
(2), (4) Date: Oct. 23, 2000

(87) PCT Pub. No.: WO99/60767
PCT Pub. Date: Nov. 25, 1999

(30) Foreign Application Priority Data

May 20, 1998 (EP) .............................................. 98303396
May 20, 1998 (GB) .............................................. 9810880

(51) Int. Cl.⁷ .................... H04M 1/2745; H04M 3/44; H04M 3/493; H04L 12/66; G06F 17/30
(52) U.S. Cl. ............... 379/218.01; 370/352; 379/93.23; 379/216.01; 379/355.03; 379/355.04; 379/355.08; 379/904; 707/10; 707/102; 709/217
(58) Field of Search ................................. 370/352, 354, 370/401, 404, 427; 379/90.01, 93.01, 93.23, 142.01, 188, 196, 197, 198, 199, 200, 216.01, 218.01, 355.03, 355.04, 355.05, 355.08, 355.09, 355.1, 904; 707/1, 10, 102, 200; 709/217

(56) References Cited

U.S. PATENT DOCUMENTS

| 5,754,636 | A |   | 5/1998 | Bayless et al. | .......... 379/142.1 |
| 6,031,836 | A | * | 2/2000 | Haserodt | .................... 370/389 |
| 6,065,016 | A | * | 5/2000 | Stuntebeck et al. | ........... 707/10 |
| 6,091,808 | A | * | 7/2000 | Wood et al. | ................. 370/352 |

FOREIGN PATENT DOCUMENTS

| EP | 0817451 A2 | 1/1998 | ............ H04M/3/42 |
| EP | 0823809 A2 | 2/1998 | ................. 707/200 |
| EP | 0833488 A1 | 4/1998 | ................. 370/389 |
| WO | WO 98/16051 | 4/1998 | ............ H04M/3/00 |
| WO | WO 98/18283 | 4/1998 | ............ 379/201.04 |

OTHER PUBLICATIONS

Patnet abstracts of Japan, vol. 097, No. 003, Mar. 31, 1997 & JP 08 317084 A.

* cited by examiner

Primary Examiner—Harry S. Hong
(74) Attorney, Agent, or Firm—Nixon & Vanderhye P.C.

(57) ABSTRACT

A method of telephone dialling comprises: accessing a remote database computer from a terminal computer; interrogating a database thereon to retrieve a required telephone number; causing the storage on the terminal computer of identification data associated with a dial out number, in persistent form; calculating, from the data and the retrieved telephone number, the telephone number to be dialled; and causing the dialling of the calculated number.

16 Claims, 12 Drawing Sheets

METHOD AND SYSTEM FOR PERFORMING DIALLING OF A TELEPHONE NUMBER SUPPLIED FROM A DATA STORE

BACKGROUND OF THE INVENTION

1. Field of the Invention

This invention relates to a method and system for performing dialling of a telephone number supplied from a data store.

2. Description of Related Art

It is known to provide a computer with a store of telephone numbers (for example, each associated with a different individual), and a telephone dialler program. For example, the store may consist of an address book held for a telephony application.

Such systems are typically provided on a single stand-alone computer. However, increasingly, large corporations are employing networks of computers. Such networks are interconnected by a connection protocol defining the "Internet". Following the growth of the Internet, and the availability of information in hypertext format using hypertext transfer protocol (http), many computer users have access both to a corporate network and the Internet. For simplicity, accordingly, many corporate networks are using Internet protocols including http, even within their own networks whether or not these are connected externally. Such internal networks using Internet protocols are generally referred to as "Intranets".

Whereas corporate networks are well protected against external intrusions (and the corresponding risk of access to or misuse of confidential data, or even damage or destruction to the data and programs of the network) it is harder to apply such protection across the Internet because of the differing interests of different users. Accordingly, standard Internet communications using, for example, http compliant web browsers, make it difficult for a server computer to access data held on a client computer (for example, one running a web browser program) and to cause the download and on line execution of a program on the client computer.

However, typically, a large organisation will wish to hold central databases (for reasons of data consistency, amongst others) on a server computer, and to provide access to these databases by remote users through server programs on their terminal computers.

An aim of the present invention is to enable a user of a terminal computer, in a network of this kind, to access the telephone number of a party he wishes to contact, and to have the telephone number automatically dialled to set up a connection to that party, using Internet-type communications protocols (e.g. the http service), over the Internet or an Intranet operating similarly thereto, whilst having regard for the security difficulties raised thereby.

Computer-telephony integration (CTI) is discussed in the following references (incorporated herein by reference):

1. Catchpole, Andrew; Crook, Gary; and Chesterman, Doug. Introduction to Computer Telephony Integration, *Br. Telecommun. Eng.*; Jul. 14, 1995, p. 98.
2. Catchpole, Andy. Computer Telephony Integration—The Meridian Norstar. *Br. Telecommun. Eng.*, Oct. 14, 1995, p. 209.
3. Johnson, Philip; Catchpole, Andy; and Booton, Laurie. Computer Telephony Integration. The Meridian 1 PBX. *Br. Telecommun. Eng.*, Jul. 15, 1996, p. 150.
4. Hillson, Graham; Hardcastle, Chris; and Allington, Marc. Callscape—Computer Telephony Integration for the Small Business. *Br. Telecommun. Eng.*, Jan. 15, 1997. P. 293.

Additionally, a number of applications programming interfaces for assisting and designing CTI systems are available; for example, the Java Telephony API (JTAPI) discussed at Sun Microsystems Java Web site java.sun.com/products/jtapi/.

BRIEF SUMMARY OF THE INVENTION

Accordingly, in the present invention, there is provided a dialling system in which dialling information is stored in permanent form on the client terminal (e.g. as a "cookie" data file on the hard disk thereof and combined with called party dial number information retrieved from a remote database on the server computer to form the dial number. Thus, simple and secure Internet access processes may be used to retrieve the number to be dialled, combine it with the dial out prefix and perform dialling.

In one embodiment, dialling is performed by the terminal computer. In this case, preferably, resident dialling programs on the terminal computer are accessed by a program (e.g. a "plugin" co-operating with a conventional web browser) which is already resident on the terminal computer rather than being downloaded during the search and dial operation. Thus, terminal computers are protected against access to their input/output devices (e.g. communications ports) from unauthorised external sources.

Preferably, the resident program in this embodiment is controlled by a downloaded program (e.g. a script or an applet) which supplies to it the number to be dialled. Thus, some of the functionality necessary at the terminal computer is maintained in the machine-independent form (e.g. using a Java or JavaScript interpreter resident thereon) rather than requiring compilation into native code depending on the processor of the client terminal.

In an alternative embodiment (which is preferably combined with the first), third party CTI is employed and dialling is instructed by the server computer.

BRIEF DESCRIPTION OF THE DRAWINGS

The present invention will now be described, by way of example only, with reference to the accompanying drawings, in which:

FIG. 6 (comprising 6a and 6b) is a flow diagram indicating the operation of the terminal computer of FIG. 1;

FIG. 7 (comprising 7a and 7b) is a flow diagram indicating the operation of the server computer of FIG. 1;

DETAILED DESCRIPTION OF EXEMPLARY EMBODIMENTS OF THE INVENTION

First Embodiment of the Invention

General Description

Figure 1:
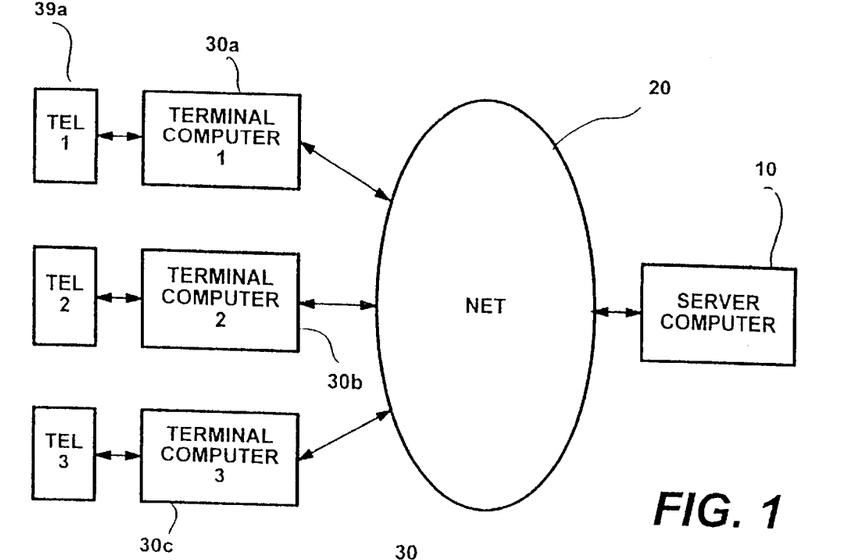
FIG. 1 is a block diagram showing the elements of a computer network utilising first party CTI, and operating according to a first embodiment of the invention.

This embodiment of the invention relates to dialling in a network using so-called "first-party CTI" or "desktop CTI". In first party CTI, a user's terminal computer 30 is linked with a telephone instrument 39 (e.g. on the same desk) through a CTI control port, enabling the computer to dial through the telephone.

The network according to this embodiment comprises a server computer 10; a local area network 20 interconnecting the server computer 10 with a plurality of terminals 30a, 30b, 30c; and a plurality of telephones 39a, 39b, 39c.

Figure 2:
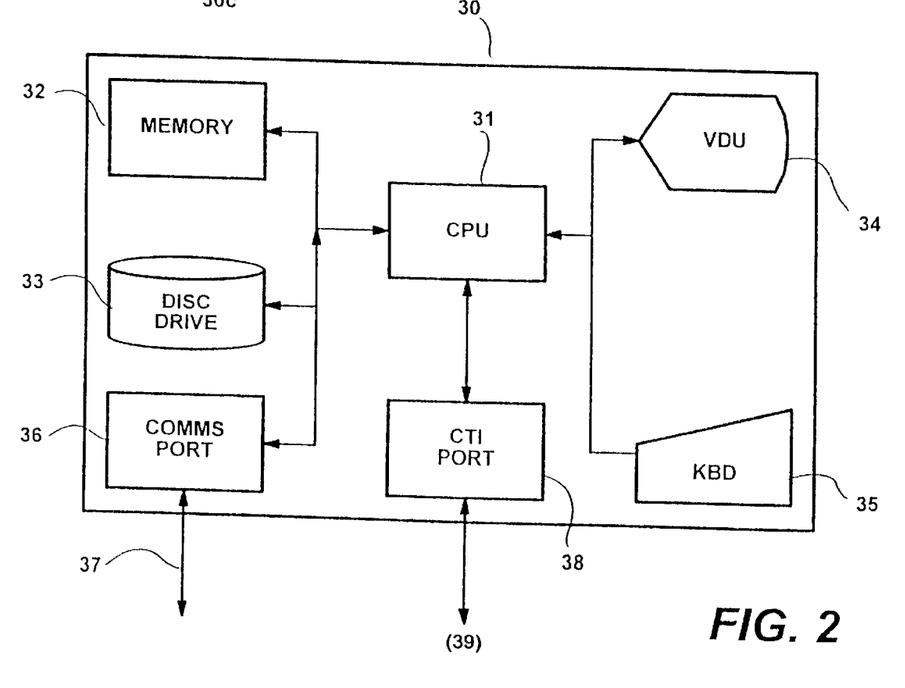
FIG. 2 is a block diagram showing the elements of a terminal computer of FIG. 1.

Referring to FIG. 2, each terminal computer 30 comprises a personal computer, network computer or workstation, consisting of a CPU 31 (e.g. an Intel Pentium™ or reduced instruction set (RISC) processor); memory 32 comprising random access memory; a hard disk drive 33 for permanent storage of data and programs; a display (VDU) 34; an input device 35 (a keyboard and, preferably, cursor control device such as a mouse); a communications port 36 in communication with the network 20 via a link 37 (e.g. a LAN cable) and a CTI port 38, connected to a CTI control port of a telephone 39 (shown in FIG. 1).

As is well known in the art, a CTI port may be used to supply a dial string to a computer controlled telephone, for example in RS 232 serial format.

Figure 3:
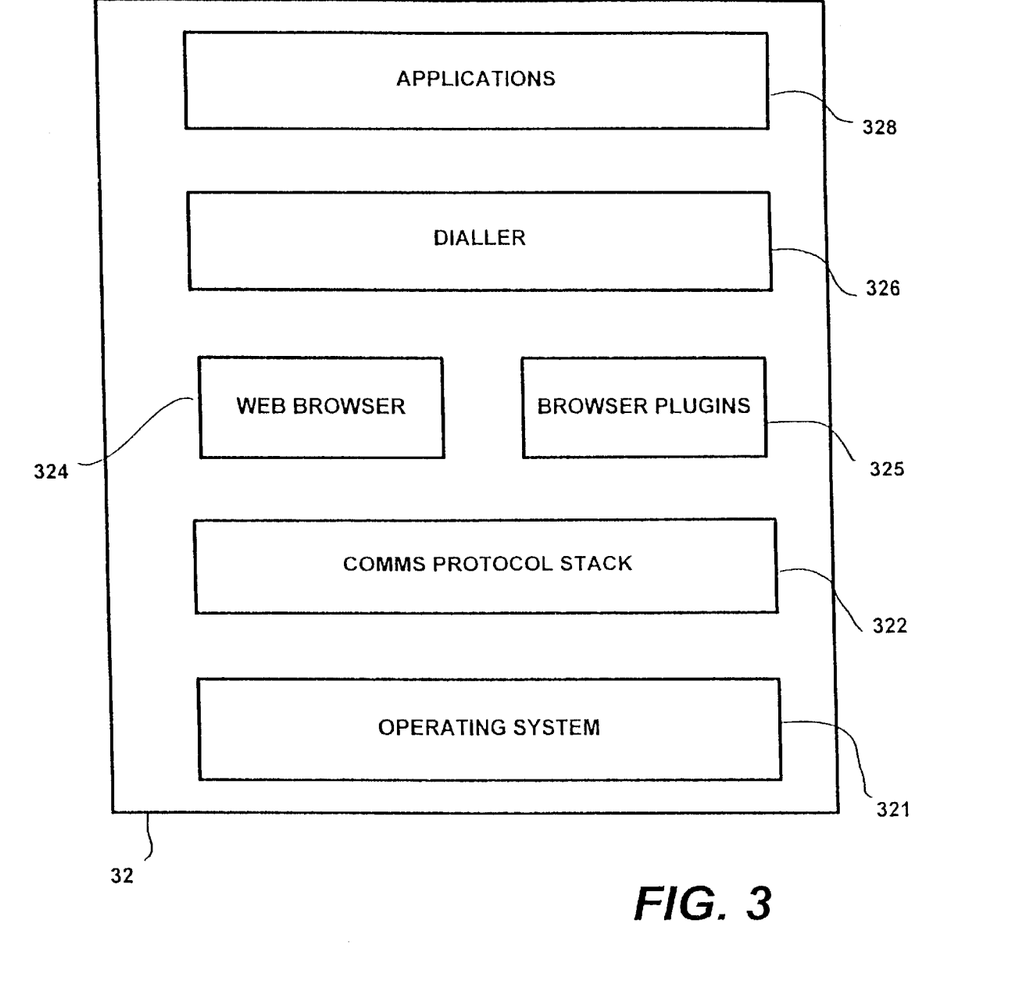
FIG. 3 is an illustrative diagram indicating the main software components present in the memory of the terminal computer of FIG. 2.

Referring to FIG. 3, within the memory 32 a number of computer programs are loaded and operative, comprising, in this embodiment, an operating system 321 (e.g. Windows 95™ or Windows NT™); a communications protocol stack 322 comprising TCP/IP or an alternative protocol for communication over the network 20; a web browser program 324 such as Netscape Navigator Version 3.0.1 available from Netscape Communications Corp., of 501 East Middlefield Road, Mountain View, Calif. 94043, U. S. A. and web site www.home.netscape; one or more browser plugin programs 325 comprising extensions to the browser program 324 capable of handling different data types; and at least one dialler program 326 (such as the VC 8000 ISDN videophone available from British Telecom; the BT Callscape 100 program available from British Telecommunications; and others) capable of controlling the telephone 39 via the CTI port 38. Finally, an applications area 328 is provided for operating other programs, and including an area in which the web browser 324 can run a JavaScript program, or a Java applet.

As neither JavaScript programs or Java applets can access input/output function or call applications resident on the terminal computer 10 (such as the dialler application 326), one of the plugin programs 325a is a program arranged to handle data identified by a MIME type unique to the present invention (and newly defined therefor) containing dial information such as the telephone number to be dialled.

This program is therefore installed off-line (i.e. not during the search and dial operation) to maintain security of the terminal computer 10. It may either be distributed on disk, or downloaded from the server computer 10 in a separate access operation, stored on the hard disk 33, and then installed therefrom, as is conventional with, for example, Netscape Navigator plugin programs.

The plugin program 325a is not interpreted by the web browser, but consists of an executable application for operation with the web browser 324. Since it is not interpreted, it needs to be compiled to native code suitable for execution on the particular processor or operating system of the terminal computer 10.

The plugin program 325a is arranged to recognise the occurrence of data identified as being a predetermined multipurpose Internet mail extension (MIME) data type, and to act on the data. It is not under the control of the web browser program 324 and can therefore access input/output devices and other applications such as the dialler application 326.

The web browser program 324 is informed that it, on encountering data of the new declared MIME type, it should call the plugin program and pass the data to it.

The plugin 325a cannot itself communicate with "cookies", and (at present) cannot communicate with downloaded Javascript programs run by the web browser program 324. Accordingly, the applications 326 include a Java applet 326a which is capable (using the LiveConnect interface available to developers from NetScape Corporation) of communicating both with the plugin program and with a downloaded Javascript program.

The applet 326a comprises a program, written in the Java™ programming language, and compiled to a machine-independent low-level code, which is executed by a Java interpreter provided within the web browser 324. It may be supplied on disc with the plugin and remain permanently resident on the disc drive 33, or it may be downloaded via the web browser program 324. It includes a native code method (i.e. a subprogram in the machine code suitable for the terminal computer processor 31).

Figure 4:
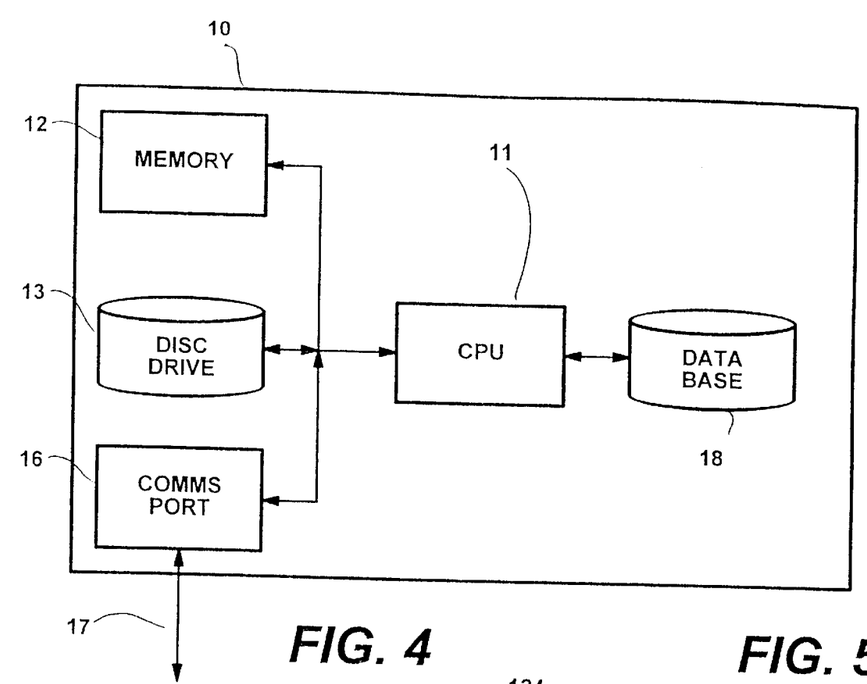
FIG. 4 is a block diagram showing the structure of a server computer of FIG. 1.

Referring to FIG. 4, the server computer 10 comprises a central processing unit 11 coupled to random access memory 12, a permanent mass storage device 13 such as, for example, a large capacity optical disk or RAID disk array; and a communications port 16 coupled, via a link 17, to the network 20.

Also provided is a database 18 (which may physically be present on the mass storage device 13) storing, in this embodiment, telephony customer details including customer name and telephone number.

Figure 5:
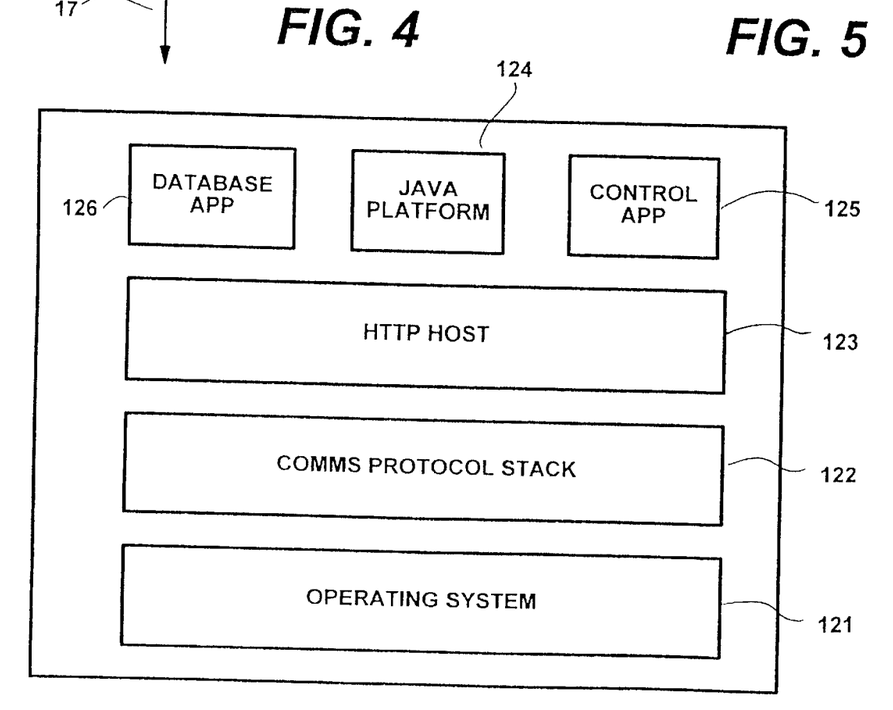
FIG. 5 is an illustrative diagram showing the main program components present in the memory thereof.

Referring to FIG. 5, present within the memory 12 during operation of the server computer 10 are an operating system 121 (e.g. UniX™); a communications protocol stack 122 such as TCP/IP; an http server program (or "daemon"); a Java platform 124; a database application 126 for interrogating the database 18; and a control application 125 for controlling the operation of the embodiment.

Figure 6A:
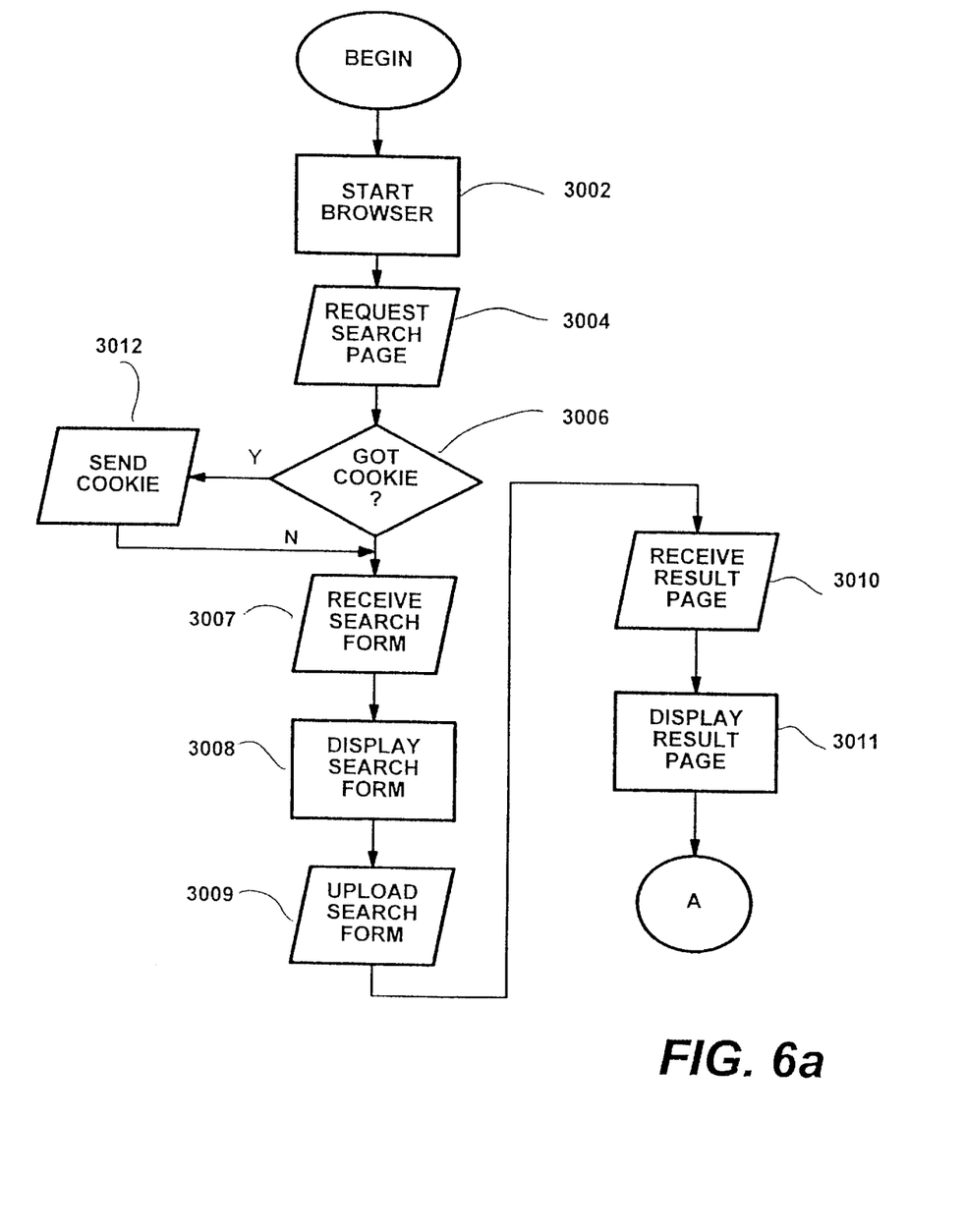
Figure 6B:
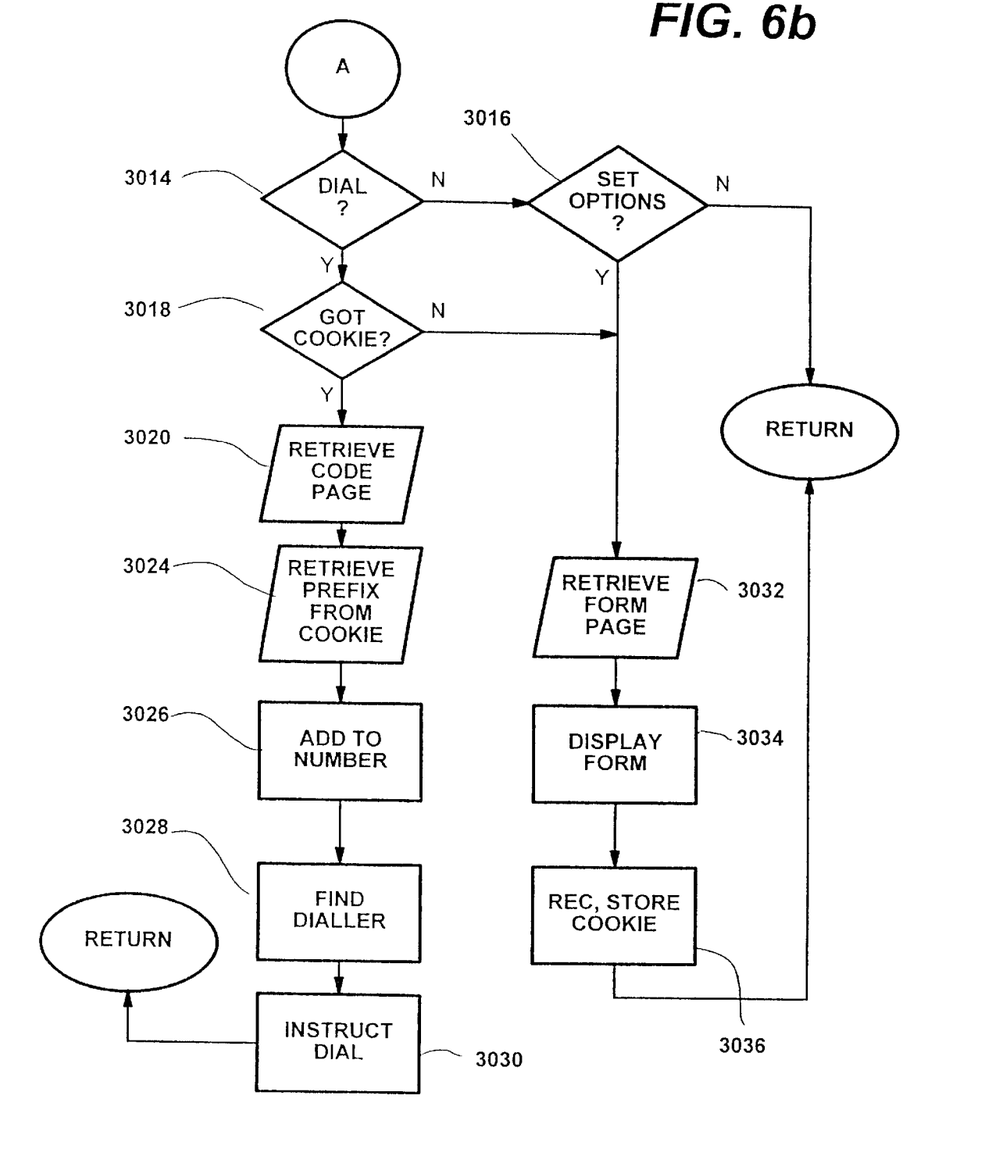
Figure 7A:
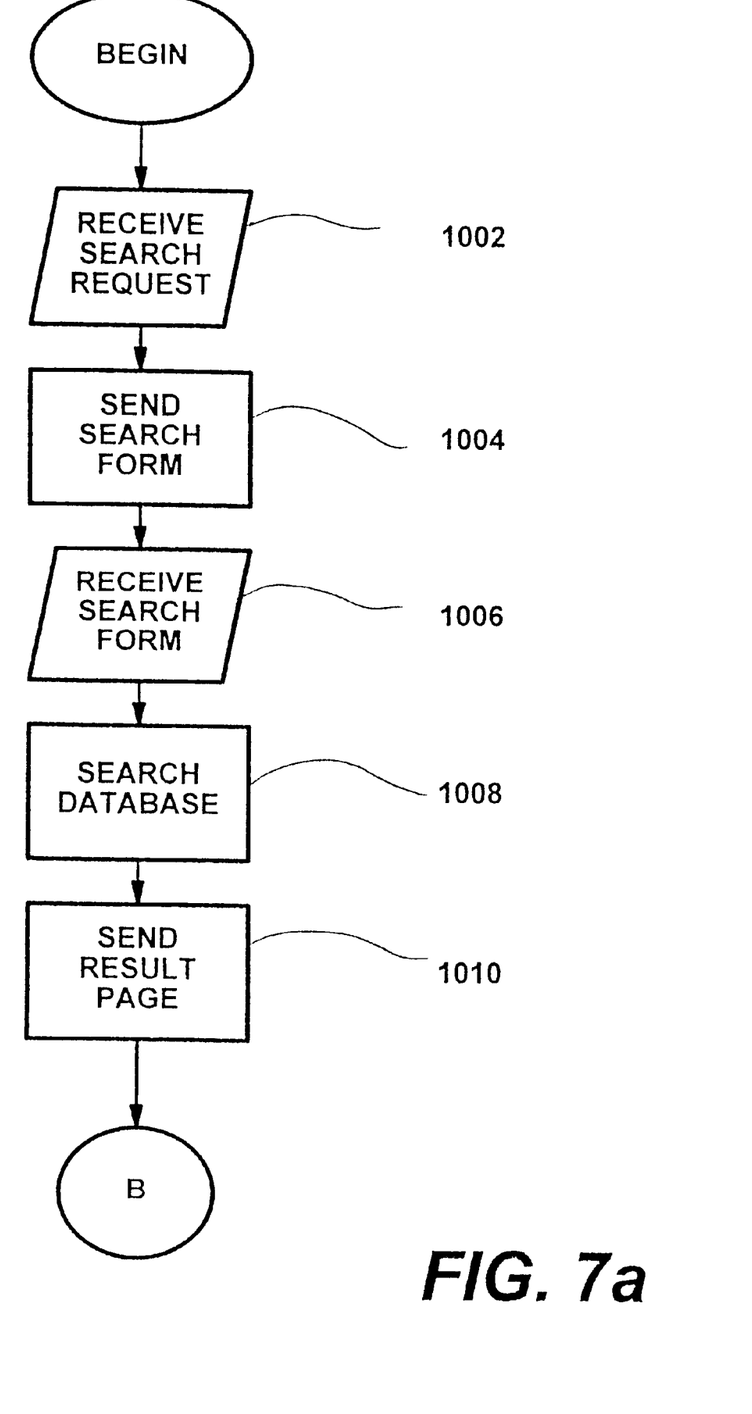
Figure 7B:
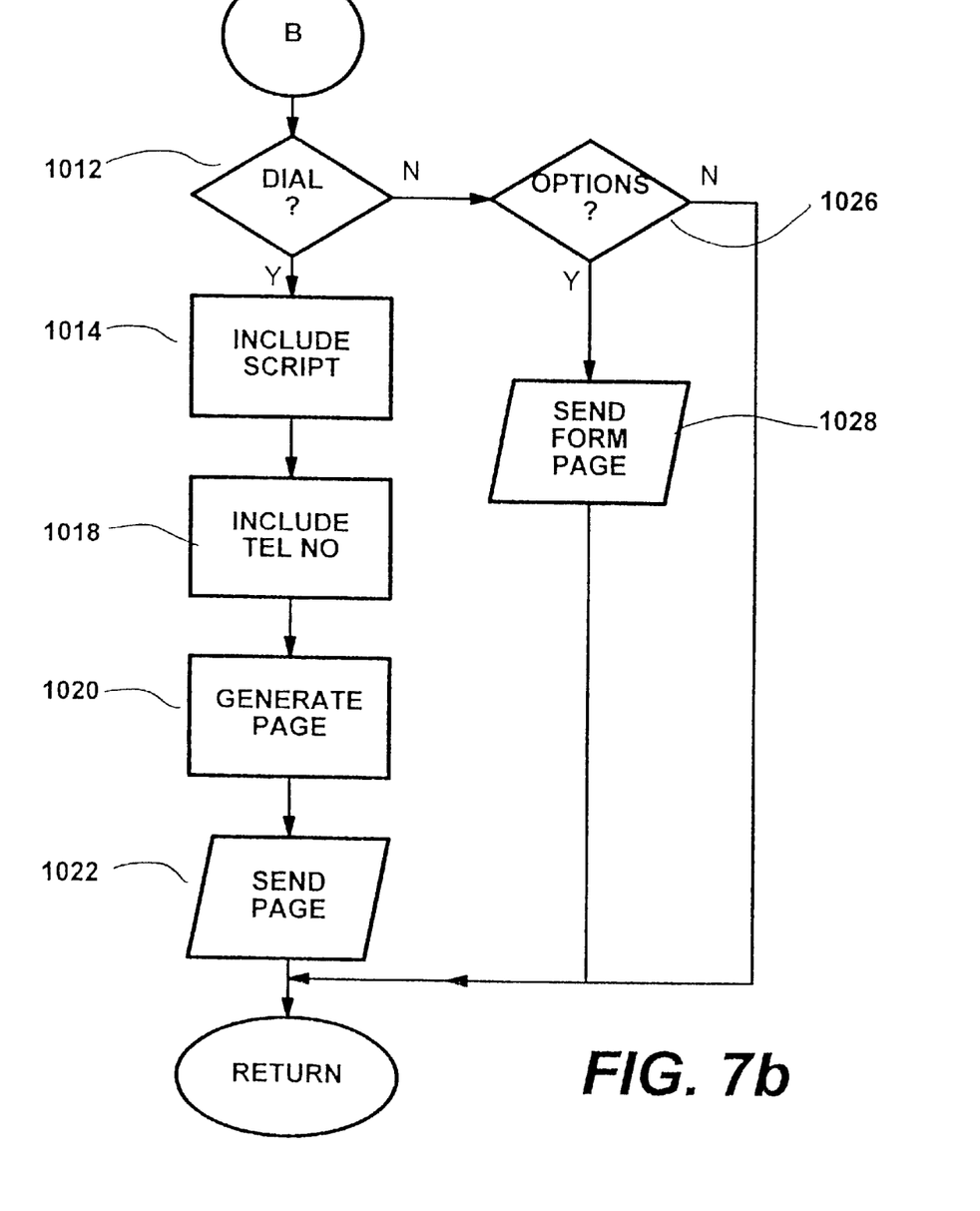

The operation of this embodiment will now be described in greater detail with reference to FIGS. 6 to 10. FIG. 6 (comprising FIGS. 6a and 6b) shows the operation of the terminal computer 30. FIG. 7 (comprising FIGS. 7a and 7b) shows the operation of the database server computer 10.

Database Search

In a step 3002, the browser program 324 on the terminal computer 30 is started by the user thereof. In a step 3004, the user causes the browser program to request the search page from the server computer 10 (e.g. by selecting from a recorded list of sites (e.g. a "hot list"), or selecting a link in a different document, or by typing in the Universal Resource Locator (URL)).

In a step 3006, the browser 324 determines whether, for the requested URL, it has previously stored any so-called "cookies" (i.e. files of data associated with particular domain names within a URL) on the hard disk drive 33, and if so, in step 3012, the browser forwards the information stored in the cookies, together with the URL request for the search page, to the server computer. All of the above steps form part of the conventional operation of a web browser program and are described here merely for convenience.

In step 3007, the search page is received, and displayed in step 3008 as an editable form. Upon completion by the user, the form results are uploaded in step 3009 and, subsequently, in step 3010, a page of results is received, and displayed in step 3011.

Referring to FIG. 7a, the corresponding operations at the server computer will be described.

Figure 8:
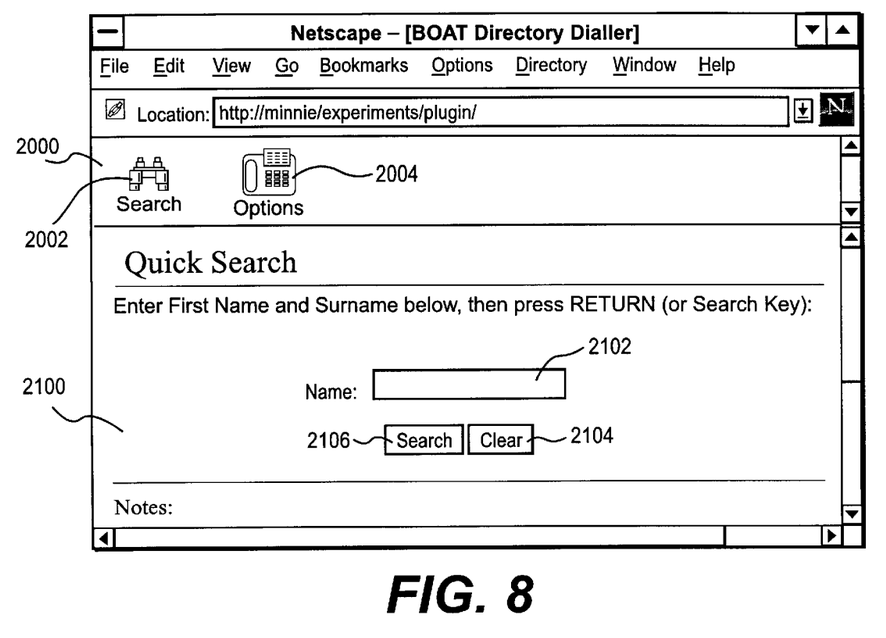
FIG. 8 is a diagram showing the screen displayed at the terminal computer to initiate a search.

In a step 1002, the search page request transmitted by the terminal computer 30 is received and in step 1004, a search page form is transmitted back down (e.g. as a Hypertext Markup Language (HTML) editable form, as shown in FIG. 8).

Referring to FIG. 8, the search page comprises two frames 2000, 2100. A first frame 2000 contains two icon images ("search" 2002 and "options" 2004) containing hyperlinks to the search frame 2100 of FIG. 8 and an options frame 2200 shown in FIG. 10. The selection frame 2000 remains displayed throughout. The search frame 2100 includes a text box 2102 for inserting text; a "clear" button 2104 for clearing the text box 2102 and a "search" button 2106, which acts to submit the data in the text box 2102 to the server computer 10.

In step 1006, the data from the form is received from the terminal 10 (comprising, for example, text strings within a desired called party's name) and in step 1008, the received data is employed to search the database 18.

The results of the database search performed by the database application 126 (comprising, typically, name, address and telephone details for each record which contained the search strings) are formulated for display in an HTML page 2300 which is transmitted in step 1010.

Thus far, the operation of the database server computer 10 is substantially similar to that of existing hypertext search engines available over the Internet.

Dialling

Figure 9:
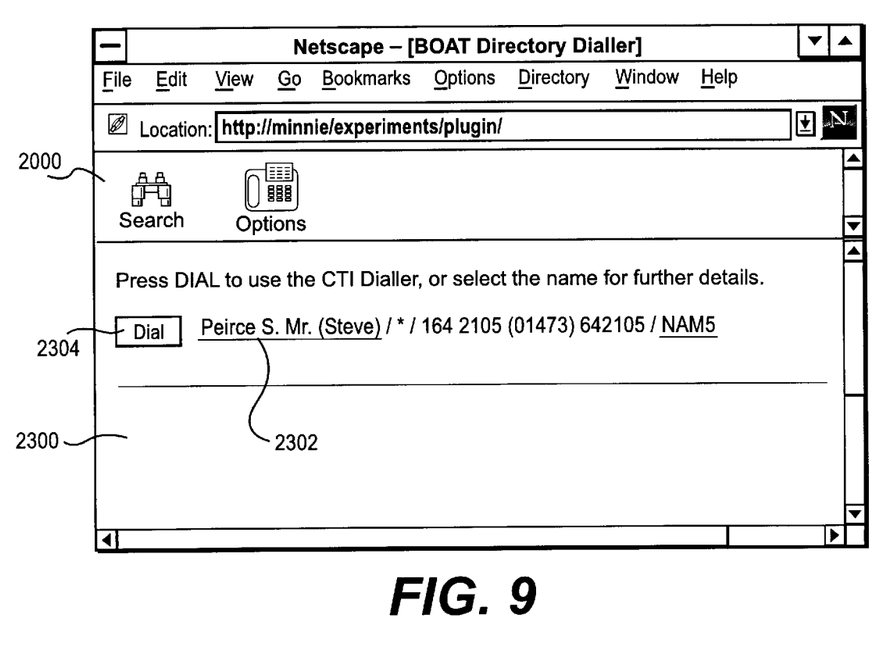
FIG. 9 illustrates a display showing the results of such a search at the terminal computer.

In this embodiment, the results page is shown in FIG. 9. The display comprises a results frame 2300. In addition to the displayed information at 2302, it will be seen to include a display button labelled "dial", 2304. Where multiple matching entries were found during the search 2302a, 2302b. . . , each will have an associated "dial" display button 2304a, 2304b.

The results page contains, in addition to HTML text for causing the display of each result, a JavaScript source code portion which monitors the operating system 321 for the occurrence of an event consisting of the user selecting the "dial" button 2304 (using either a mouse or keyboard 35).

The web browser 324 includes a JavaScript interpreter, such as the JavaScript Run Time Interpreter in Netscape Navigator Browser or the JScript Interpreter in the Internet Explorer browser, which is arranged successively to interpret the statements of the script contained within the downloaded results page 2300.

Returning now to FIG. 6b, when (step 3014) the dial button 2304 is selected, the JavaScript program interrogates the web browser program 324 (step 3018), to determine whether the web browser program had previously stored a cookie (i.e. data file) on the hard disk 33, storing the user's dial preferences.

In step 3020, the JavaScript application returns the stored data from the cookie, to the server computer 10 together with a request to retrieve the HTML page containing the dialler code (in the form of the URL of that page on the server computer 10).

Referring to FIG. 7b, in step 1012, on receiving the request for the dial code page transmitted from the user's terminal computer 30, the server computer 10 prepares the dialling code page, which will include a script program. The script, as discussed above, is in the JavaScript scripting language and is interpreted by a script interpreter provided within conventional browser programs 324.

In most web browser programs 324, the Java interpreter will not interpret instructions to access input/output devices, disk drives, or memory locations. The same is true of the JavaScript interpreters therein. Accordingly, neither the JavaScript application nor the applet can control operation of the dialler program 326.

Accordingly, in a step 1014, the control application 125 of the server computer 10 incorporates into a new undisplayed HTML page an indication of the new MIME type, indicating that the following telephone number data will be for handling by the dialler access plugin 325a.

In steps 1018 and 1020, the script (the functions of which will be described below) is included in the HTML page. In broad terms, the script is included since it can read the cookie at the terminal computer, and communicate with the applet 326a on the terminal computer 30, which can communicate with both the script and the plugin, utilising the LiveConnect feature available from Netscape Communications Corporation, full documentation for which is available at web site home.netscape.com/cornprod/products/navigator/version3.0/building_blocks/live connect/how.html.

In step 1018, the telephone number of the selected record (associated with the "dial" button 2304 which was selected) is included in the page which is generated at step 1020 and forwarded in step 1022 to the client computer 30.

Referring now to FIG. 6b once more, the dialler code page is retrieved and the Javascript program and applet 326a are loaded into memory and their execution commenced, in step 3020. The dialler plugin program 325a is loaded into memory by the browser on encountering the new MIME type and recognising it as corresponding to dialling data for the dialler plugin 325a.

In step 3024, the terminal computer 30, operating under control of the JavaScript program, retrieves, and reads the contents of, the cookie file stored on the hard disk drive 33. These contents comprise a string of decimal digits defining the prefix (i.e. dial out code) to be used (e.g. "9"), together with an ordered list defining preferences for dialler program specifying which, if present, is preferred (as discussed below).

The appplet 326a then concatenates the number to dial with the dial out prefix (i.e. adds the prefix to) in step 3026, and in step 3028 executes a call to the plugin program 325a, passing the list of dialler program preferences. In response, the plugin program 325a searches the hard disk drive 33 for the listed dialler programs 326 in the order of preference in which they are listed, and on first encountering a listed dialler application, instructs it to dial the concatenated number in step 3030.

For example, the dialler applications may be BT Callscape 100; the BT VC 8000 ISDN videophone; the Concert One voice application (which is called using the Microsoft Dynamic Data Exchange (DDE) interprocess communication method); or a networked secretary (in which case an e-mail message is generated and sent to the secretary's workstation requesting that the secretary set up an out going call).

In the process described above, a separate dialling code page is retrieved on dialling. However, it may be preferred to simplify operation of the system and reduce the number of communications, by providing the Javascript and MIME identification of the dialled number all in the results page. In this case, on selecting the "dial" button 2304, the Javascript program at the terminal computer 30 will call the Java application 326a, passing it the cookie data, and the Java application 326a in turn will call the dialler plugin 325a to access the dialler programs as described above.

Setting Options

Figure 10:
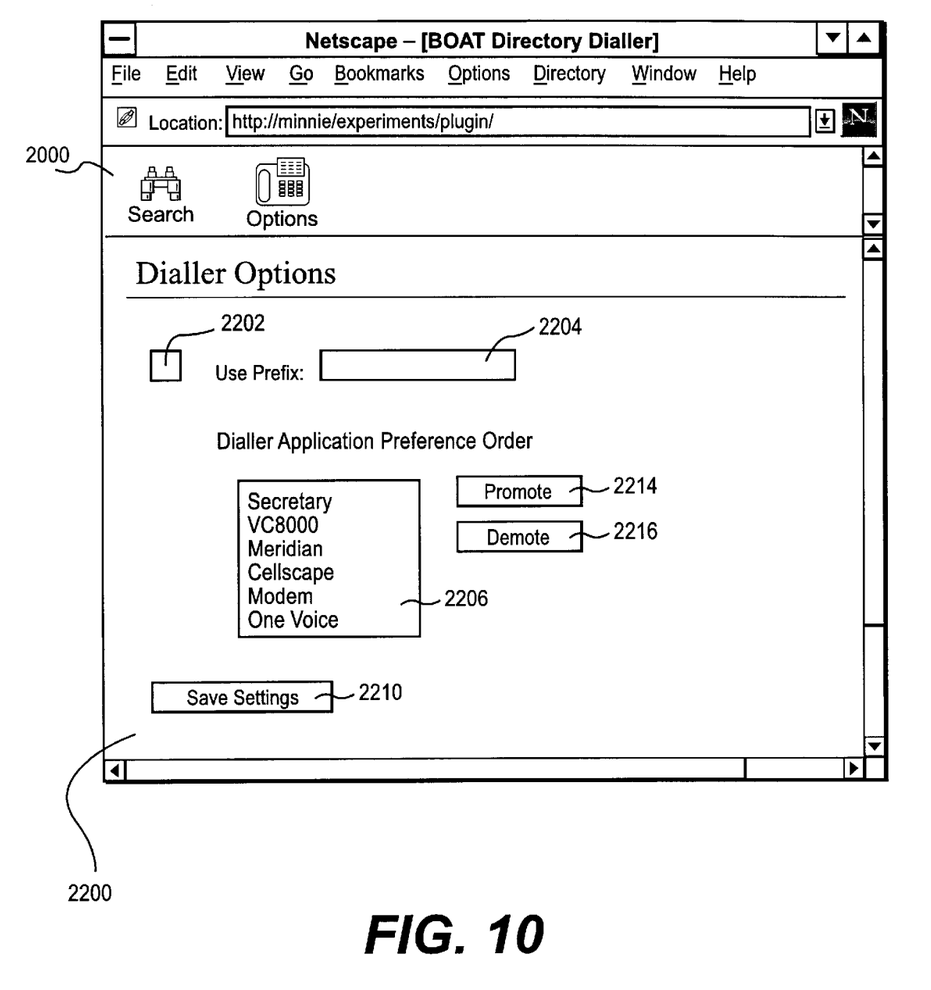
FIG. 10 illustrates a display allowing the input of data at the terminal computer.

The process whereby the dial-out prefix and dialler preference options are set will now be disclosed with reference to FIGS. 6, 7 and 10.

The process of setting the options is initiated in one of two ways; either by selection of the "options" link 2004 within the frame 2000, or where, at step 3018, dialling has been requested but there is no cookie currently stored on the terminal computer 30.

In either case, the JavaScript program on the terminal computer 30 generates a URL for transmission to the server computer 10, requesting the download of a form page 2300 for completion by the user at the terminal computer 10.

As shown in FIG. 10, the form comprises three data entry areas; a check box 2202 indicating whether or not a dial out prefix is to be used; an edit box 2204 for insertion of the dial out prefix (by default, "9") is displayed; and a list box 2206 listing a plurality of diallers likely to be found on the or each terminal 30.

Also provided are a button 2210 for causing the options settings shown on the screen to be saved; and a pair of buttons 2214, 2216 for changing the sequence of listed dialler applications.

For convenience, the check box and edit box, together with the "save settings" button 2202, 2204, 2210 are implemented using JavaScript, and the list box and buttons 2206, 2214, 2216 are implemented by a Java applet.

In step 1026 of FIG. 7b, the server computer 10 receives the request from the client computer 30 for the display of the options page, and in step 1028, the page comprise JavaScript and a Java applet for causing the display shown in FIG. 10 is transmitted.

Referring once more to FIG. 6b, in step 3034, on receipt, the web browser program 324 causes the display of the form as shown in FIG. 10. The user can then enter a dial prefix in the edit box 2204; check or uncheck the check box 2202 to indicate whether or not the prefix should be used; and order the dialler options as required using the buttons 2214, 2216. This is achieved by selecting one of the listed dialler options with the keyboard or mouse 35, and then pressing the "promote" button 2214 to progressively move that option up the list of preferences, or the "demote" button 2216 to move it down the list of preferences, until the order is as required.

On selection by the user of the "save settings" button 3010, the downloaded Java applet causes the JavaScript program to record a cookie with the following data:

Name—Transient

Expires on—Some suitably distant future date

Prefix—the dial out string

Use prefix—A true/false flag

Dialler preferences—the initial letter, or some other code uniquely identifying each dialler application, in order of preference as a string.

Second Embodiment

Figure 11:
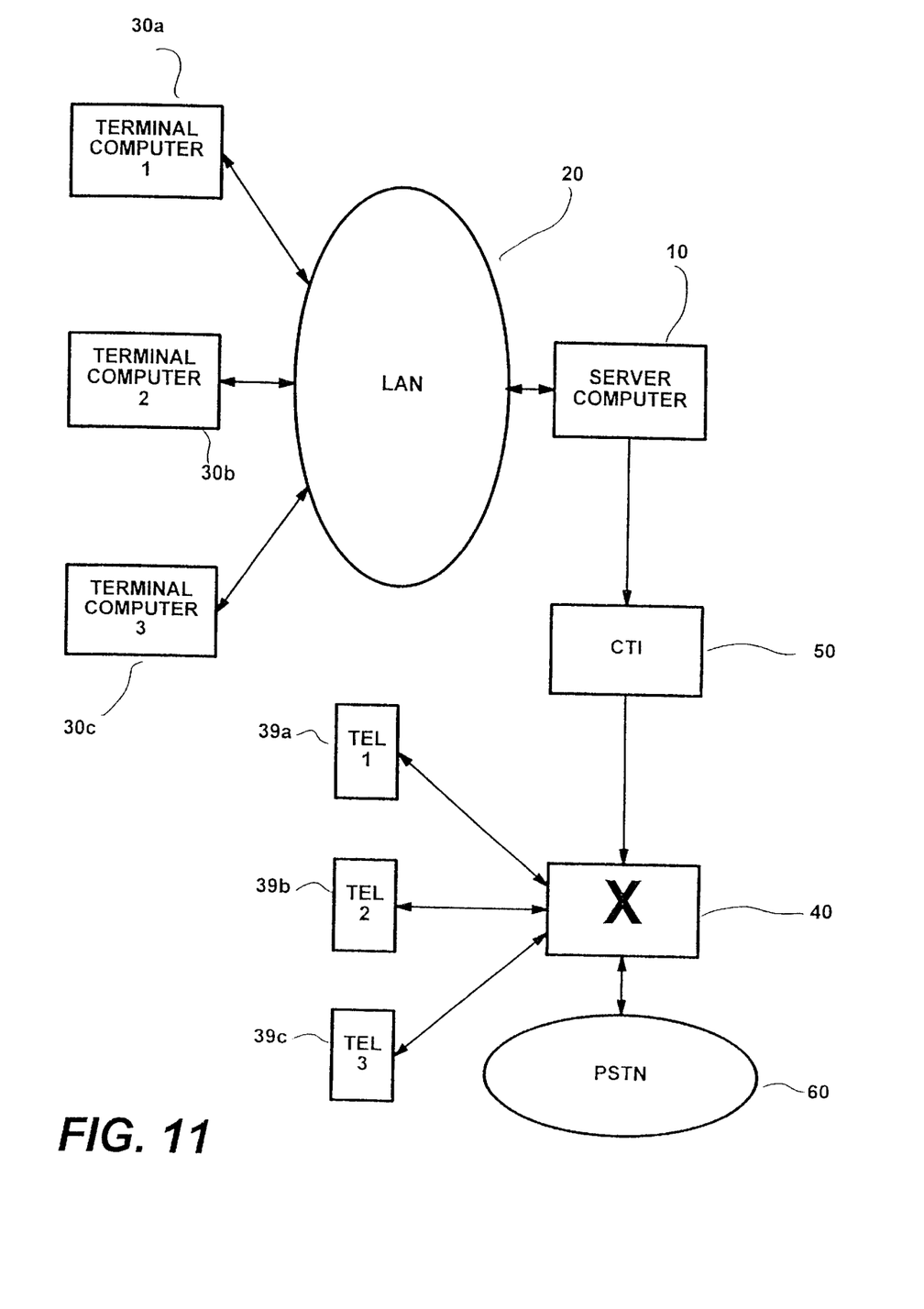
FIG. 11 is a block diagram, corresponding to that of FIG. 1, illustrating a computer network utilising third party CTI and operating according to a second embodiment of the invention.

Referring to FIG. 11, in a second embodiment of the invention, "third party" CTI is employed. Thus, the terminal computers 30a–30c are interconnected with the server 10 via a local area network 20, but are not themselves connected to control telephones and hence do not require dialler programs. However, each computer 30 is close to a telephone station, and the telephone stations 39a–39c are each associated with a respective user of one of the computers. The telephone stations 39a–39c are connected to a private branch exchange (PBX) 40 which is also connected to the PSTN and/or internal telephone network 60.

Interconnecting the PBX 40 and server computer 10 is a computer-telephony integration link. The link may be the BT Meridian product, as described in "Computer Telephony Integration The Meridian Norstar", by Andy Catchpole, British Telecommunications Engineering Journal, October 1995, 14, p. 209.

Using such a link, as is known in the art, a computer such as the server computer 10 can control the PBX 40 to interconnect a selected one of the extension telephones 39a–39c with an internally dialled number.

Where this embodiment is used separately of the first embodiment, the terminal computers 10 are modified from those of FIG. 2 in that they no longer require the CTI port 38, and no longer need to store an additional dialler plugin 325a, or dialler application 326.

The database access processes described in relation to FIGS. 6a and 7b are performed in this embodiment in substantially the same manner. Thus, in order merely to display database information, this embodiment acts substantially like a conventional web-based database access system.

Figure 12:
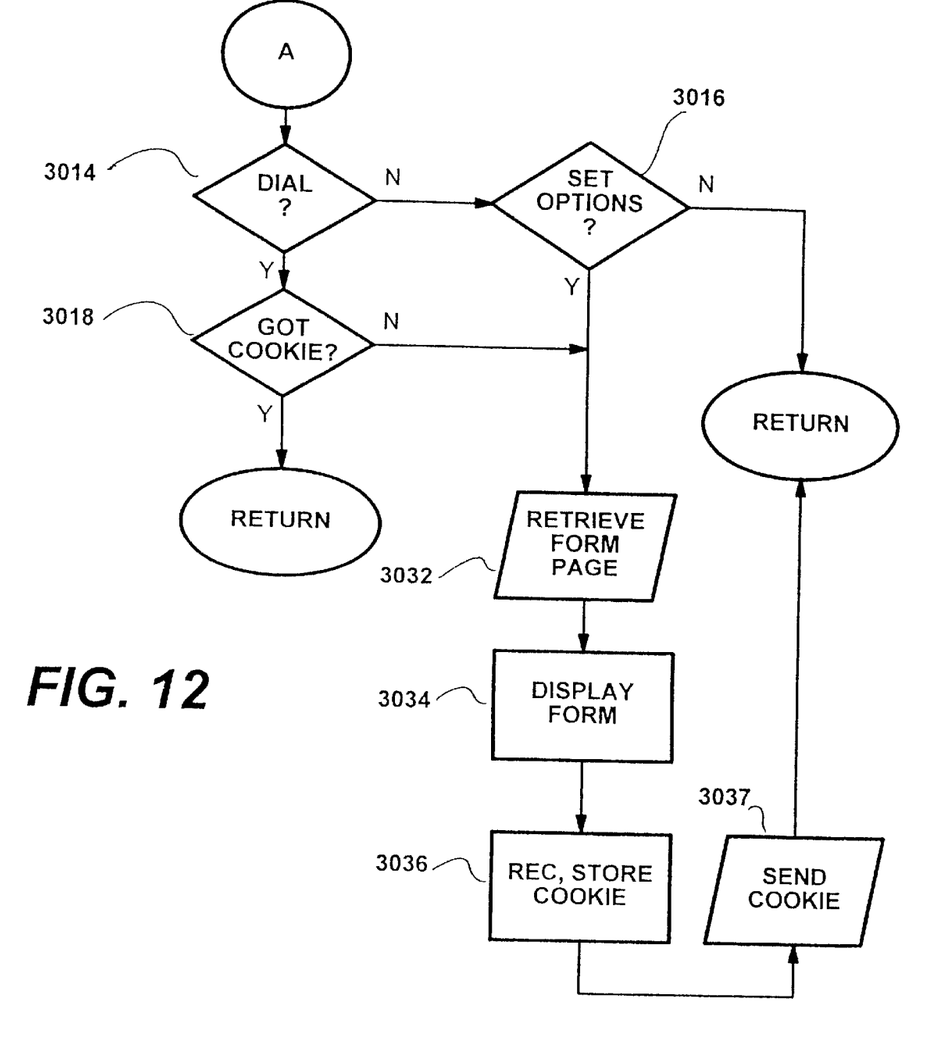
FIG. 12 is a flow diagram corresponding to FIG. 6b and indicating the modifications thereto according to second embodiment.
Figure 13:
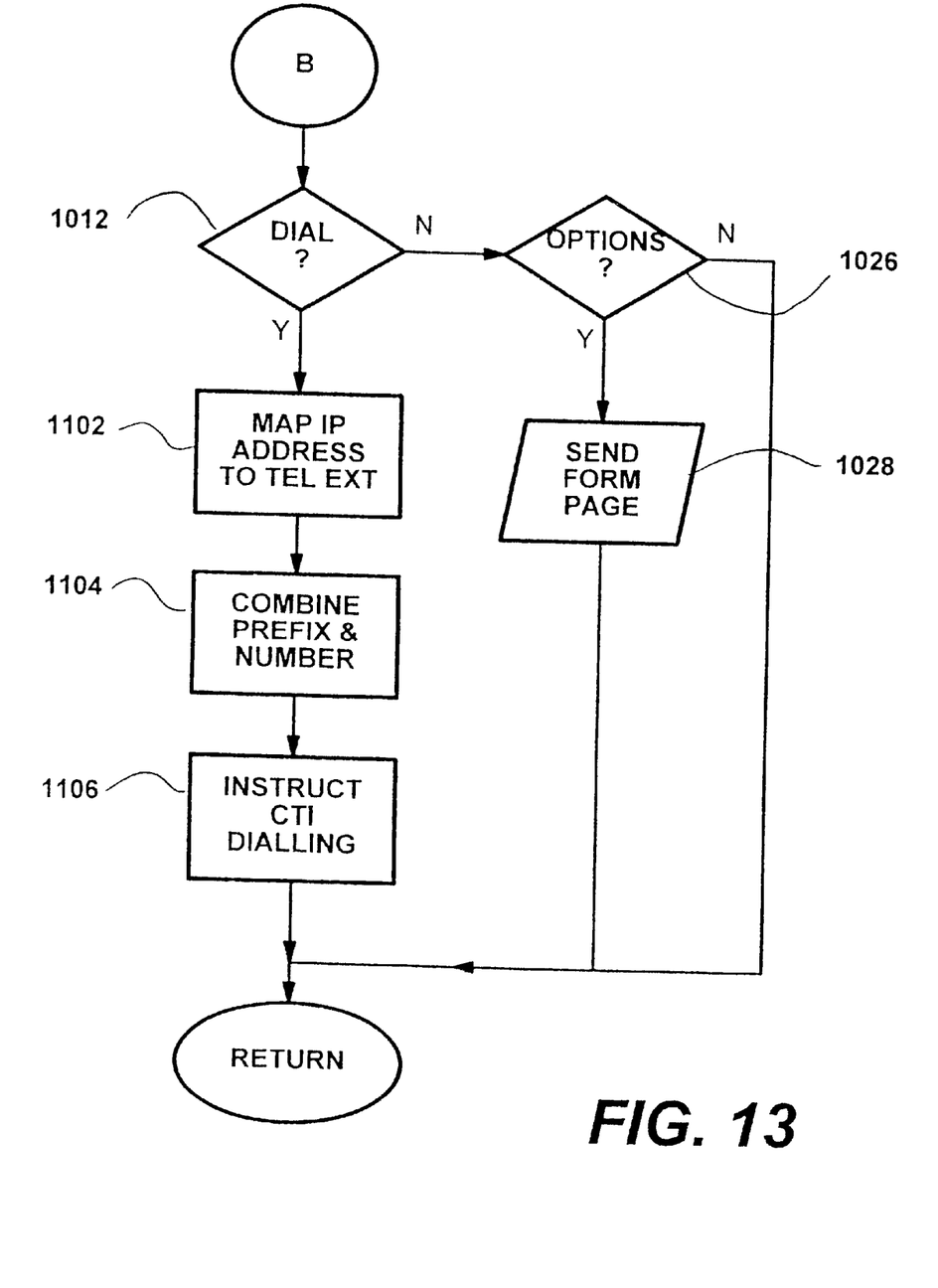
FIG. 13 is a flow diagram corresponding to FIG. 7b and showing the modifications thereto in the second embodiment.

Referring now to FIGS. 12 and 13, which replace FIGS. 6b and 7b respectively, at the client terminal computer 30, when the dial button 2304 is selected (step 3014) then, as before, in step 3018 it is determined whether a cookie file is held on the hard drive 33 in relation to the URL domain of the server computer 10 and, if so, no further action is taken. If not, or where, as in the first embodiment, in step 3016 the user selects redefinition of the stored options, then steps 3032, 3034 and 3036 are performed to enable the input of the options data for storage of a new cookie.

Additionally, in step 3037, the data filled into the form, and stored in the cookie, is forwarded to the server computer 10.

Referring to FIG. 13, on receiving (step 1026) a signal from the terminal computer 30 requesting the defined options page, then as in the first embodiment in step 1028 the editable form 2200 with JavaScript program is transmitted back.

On receiving (step 1012) a signal from the terminal computer 30 indicating that a number should be dialled, in this embodiment, rather than downloading programs and data for dialling to the terminal computer 30, the dialling is performed from the server computer 10, as follows.

In a step 1102, the server computer 10 accesses a table stored on the hard disk drive 13, comprising, for each terminal computer 30 in the network, a mapping between the IP address of that computer and the telephone extension 39a–39c which is convenient for the user of that computer. As in conventional Internet communications the IP address of the terminal computer is supplied with each communication therefrom to the server computer.

Thus, to determine the relevant extension telephone to dial from, in step 1104, the control application 125 (which may in this embodiment be a CGI script or Java application) reads the dial out prefix from the uploaded cookie information sent (in step 3037 or in step 3012) and concatenates this with the number to be dialled.

In step 1106, the server computer 10 supplies the concatenated number to be dialled, together with the extension, to the PBX 40 via the CTI interface 50. Accordingly, the PBX 40 sets up the call.

OTHER EMBODIMENTS AND MODIFICATIONS

Various modifications to the above described embodiments will be apparent to the skilled reader. For example, it is preferred to provide a system which combines the features of both embodiments, thus allowing a user to select either third party or first party CTI where both are available.

Although in the above described embodiments, the dial prefix is based on a PBX external dialling code, it would be possible for the system to take account of called party numbers and terminal computers in different countries or on different telecommunications networks, by allowing the input on the preferences form of international access codes from the telephone associated with each terminal computer 10, and concatenating the international access code with the called party number where the called number is in a different territory or a different network to the telephone 39.

Whereas, in the first embodiment, the concatenation and various display operations are carried out by JavaScript applications and applets at the terminal computer 30, it would be possible in the first embodiment for the concatenation of prefix and number to be performed at the server computer 10 based on the dial out prefix forwarded in the cookie from the terminal computer 30, and for the server computer 10 then to forward the entire number, identified as being of a predetermined MIME type associated with the dialler plugin 325a, together with the dialler preference string. In this case, in response, the browser program 324 passes control to the plugin 325a, which then proceeds as described above in relation to the first embodiment.

However, in general it is preferred to use the method in described in relation to the first embodiment, to reduce the load on the server 10 by passing processing to the terminal 30.

Whilst the present embodiments have described the use of plugins and JavaScripts and applets, it would be possible to use ActiveX controls, co-operating with Microsoft Internet Explorer browsers.

Whilst the first embodiment makes use of both JavaScript programs and applets, it is understood that tools for developing applets which can read and write cookies are already available and, accordingly, the present invention incorporates embodiments in which a single applet performs both the functions of the applet and script described above.

Although only a single dialout prefix is discussed above, the invention may make use of multiple alternative prefixes, for example one for each dialler application.

Many other variants and modifications will be apparent to the skilled reader and, accordingly, the present invention is not to be limited to the described embodiments but extends to any and all such variants and modifications. For the avoidance of doubt, protection is sought for any and all combinations of novel features disclosed herein.

What is claimed is:

1. A method of telephone dialling comprising:
   accessing a remote database computer from a terminal computer;
   interrogating a database thereon to retrieve a required telephone number;
   causing the storage on said terminal computer of identification data associated with a dial out number;
   calculating, from said data and said retrieved telephone number, the telephone number to be dialled; and
   causing the dialling of said calculated number.

2. A method according to claim 1, in which the data comprises the dial out number.

3. The method of claim 1, in which calculating the telephone number to be dialled is performed at the terminal computer.

4. The method of claim 3, further comprising downloading onto said terminal computer a program for performing said calculation, and causing said program to execute.

5. The method of claim 1, in which causing the dialling of the calculated number is performed at said terminal computer.

6. The method or claim 1, in which calculating the telephone number to be dialled is performed at the remote database computer.

7. The method of claim 1, wherein causing dialling of the calculated number is performed at said remote database computer.

8. A computer dialling system comprising:
   at least one telephonic instrument capable of dialling;
   a computer storing a database comprising a plurality of records each containing a telephone number;
   a terminal connected to the computer and arranged to interrogate the computer to receive therefrom a desired said telephone number;
   the terminal being arranged to store dial out information indicating a prefix to be dialled for telephone access from an associated said telephonic instrument;
   in which the computer is arranged to cause the storage on the terminal of a record associated with a suitable dial out prefix for the terminal, and to receive said record from the terminal on each access therefrom, and is arranged to cause the telephonic instrument to dial out a connection based on a combination of said prefix and said desired telephone number.

9. The system of claim 8 in which said terminal is arranged to receive from said computer, and said computer is arranged to supply to said terminal, a program for immediate execution on said terminal to cause said terminal to instruct said associated telephonic instrument to which it is connected to dial said number.

10. The system of claim 8, in which said computer is arranged to receive said prefix from said terminal, and is arranged to instruct said associated telephonic instrument to which said computer is connected to dial said combined number.

11. A method of telephone dialling comprising:
   accessing a remote database computer from a terminal computer;
   interrogating a database thereon to retrieve a required telephone number;
   causing the storage on said terminal computer of data defining a preference order for multiple dialler programs;
   using the data to select a dialler program; and
   causing the dialling of said number using the selected dialler program.

12. A computer dialling system comprising:
   at least one telephonic instrument capable of dialling;
   a computer storing a database comprising a plurality of records each containing a telephone number;

a terminal connected to the computer and arranged to interrogate the computer to receive therefrom a desired said telephone number;

the terminal being arranged to access said telephonic instrument using a plurality of different dialler programs;

in which the computer is arranged to cause the storage on the terminal of a record of preference information specifying preferred said dialler programs, and to receive said record from the terminal on each access therefrom, and is arranged to select a said dialler program in accordance therewith.

13. A method of claim 1, wherein the identification data is caused to be stored on the terminal computer in a permanent form.

14. A system of claim 8, wherein the record caused by the computer to be stored on the terminal is a permanent record.

15. A method of claim 11, wherein the data defining a preference order is caused to be stored on the terminal computer in a permanent form.

16. A system of claim 12, wherein the record caused by the computer to be stored on the terminal is a permanent record.

* * * * *